United States Patent [19]  
Nollkamper

[11] Patent Number: 4,501,657  
[45] Date of Patent: Feb. 26, 1985

[54] PREHEATING OF DISTILLATION FEED
[75] Inventor: Milton H. Nollkamper, Sweeny, Tex.
[73] Assignee: Phillips Petroleum Company, Bartlesville, Okla.
[21] Appl. No.: 462,850
[22] Filed: Feb. 1, 1983
[51] Int. Cl.³ .......................... B01D 3/42; C10G 7/12
[52] U.S. Cl. ............................. 208/350; 208/DIG. 1; 196/132; 203/1; 202/160
[58] Field of Search ................... 202/160, 206; 203/1; 208/DIG. 1, 347; 196/132; 208/350

[56] References Cited  
U.S. PATENT DOCUMENTS

| | | | |
|---|---|---|---|
| 2,357,113 | 8/1944 | Houghland et al. | 202/160 |
| 2,580,261 | 1/1952 | Boyd, Jr. | 202/160 |
| 3,158,557 | 11/1964 | Tolin | 202/160 |
| 3,165,454 | 1/1965 | Wienecke | 202/160 |
| 3,182,005 | 5/1965 | Lupfer | 202/160 |
| 3,239,457 | 3/1966 | Heckart | 196/132 |
| 3,881,994 | 5/1975 | Fickel | 202/206 X |
| 4,003,799 | 1/1977 | Fickel | 202/160 X |
| 4,019,964 | 4/1977 | Fickel | 202/206 X |

Primary Examiner—Delbert E. Gantz  
Assistant Examiner—Glenn A. Caldarola

[57] ABSTRACT

The heat to a feed in a distillation operation is controlled in response to the amount of liquid in a liquid condensate collection means.

41 Claims, 1 Drawing Figure

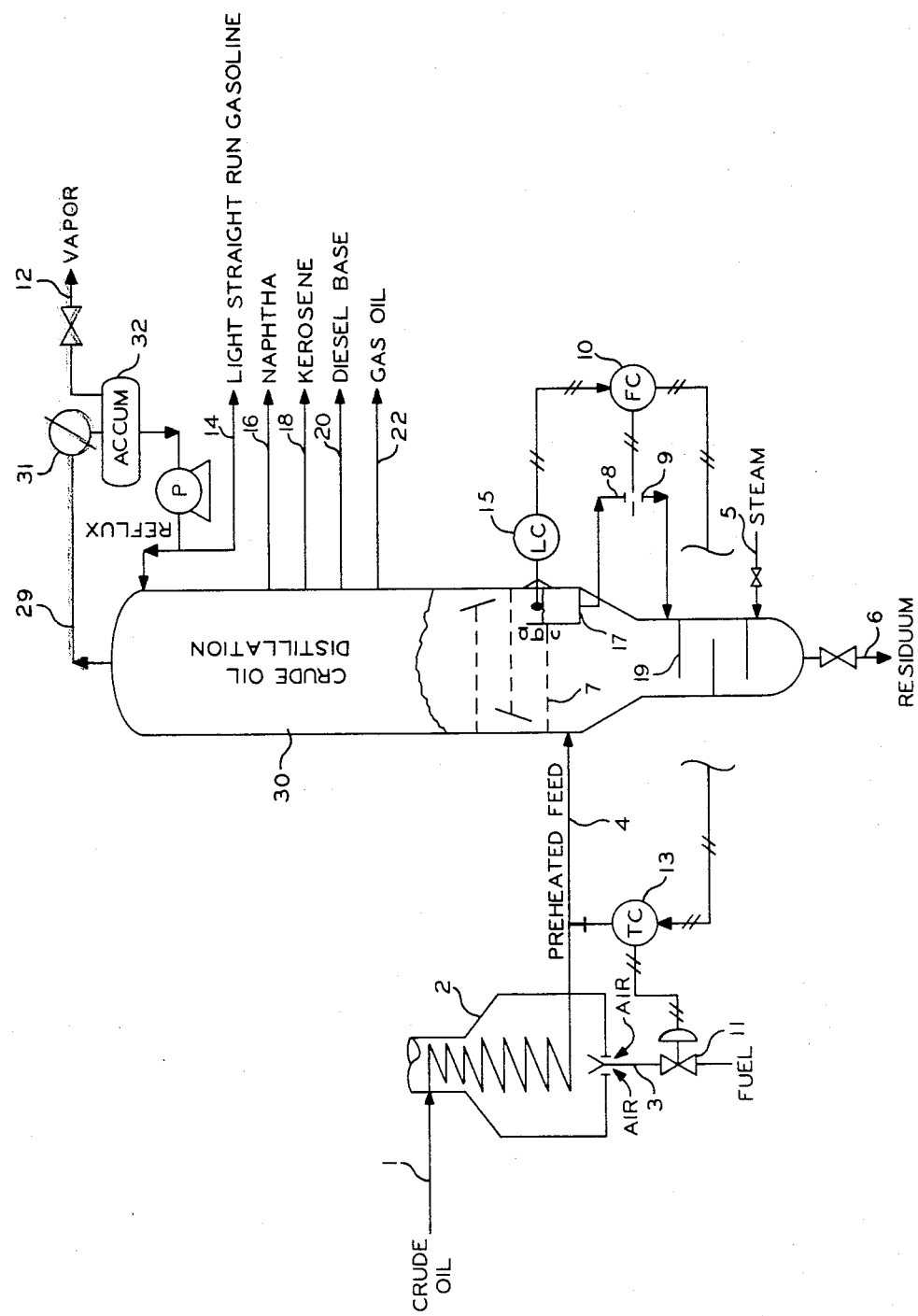

collection means, the amount of liquid in the collection means will decrease. The rate at which liquid collects in the collection means is a function of the amount of the feed that is vaporized. The removal rate can be adapted for a given distillation operation such that the amount of liquid in the collection means can be used to determine, as the distillation proceeds, whether more or less of the feed should be vaporized (i.e. whether more or less heat should be supplied to the feed). A decrease in the amount of liquid in the collection means indicates that a greater portion of the feed should be vaporized by increasing the amount of heat supplied to the feed. An increase in the amount of liquid in the collection means indicates that a lesser portion of the feed should be vaporized by decreasing the amount of heat supplied to the feed. By controlling the amount of heat supplied to the feed in this manner the amount of liquid in the collection means remains substantially constant or substantially within a preselected range and the desired control over the amount of vaporization which is effected.

In one embodiment of this invention liquid removed from the collection means is directed to a section of the distillation column below the feed inlet. This section can be, for example, a stripping section.

The preheating means (or zone) can be any means suitable to heat a feed. By way of nonlimiting example it can be a fuel-burning furnace through which the feed is passed. Fuel can be introduced into the furnace through a valve-controlled conduit or through any other means. In one embodiment of this invention the amount of vaporization of feed is controlled by controlling a valve that regulates the rate at which fuel is introduced into the furnace. The valve is controlled in response to the amount of liquid in the collection means.

The means and method to control the amount of heat supplied to the feed in response to the amount of liquid in the collection means can be of many different types. For example, a system of electronic controls and signals can be used to implement automatic monitoring of the amount of liquid in the collection means and automatic control of the heating means in response thereto. This invention can also be practiced by manually controlling the heating means in response to an observed change in the amount of liquid in the collection means. Numerous combinations of automatic and manual steps or procedures that can be used to practice the invention are, given this disclosure, within the skill of those practicing the relevant art.

The liquid condensate collection means can be any device capable of collecting liquid produced by condensation, in the distillation column, of vapor. A trap-out pan, for example, is well suited for this purpose.

The means for measuring or otherwise sensing the amount of liquid in the collection means can be any device capable of so doing. This invention is not limited thereby. By way of example, a conventional liquid level indicator is suitable. It should be noted that it is not necessary to determine the actual amount of liquid in the collection means. All that is required of the measuring or sensing means is the capability to detect an increase or decrease in the amount of liquid.

Conventional distillation columns are suitable for the practice of this invention. A typical distillation column will have a plurality of distillation trays positioned above the feed inlet. Typically, some of these trays will have trap-out pans. In one embodiment of this invention the lowest of these trap-out pans is employed as the liquid condensate collection means of this invention (i.e. the heat imparted to the feed is controlled in response to the amount of liquid in the lowest of these trap-out pans). It should be noted that the lowest of these trap-out pans is not necessarily the lowest trap-out pan in the distillation column since trays positioned below the feed inlet may also have trap-out pans.

The distillation column of this invention can include a reboiler or other residuum heating means. Alternatively, the distillation column can be without a reboiler or other residuum heating means. Furthermore, this invention is not restricted to any particular range of pressure. Those of skill in the art are able to set the operational parameters best suited to their particular feed, apparatus and objectives.

Attention is courteously directed towards the FIGURE wherein an embodiment of my invention is depicted. The feed (crude oil liquid) 1 is passed to, and indirectly heated in, furnace 2. A fuel is passed through conduit 3 and burned in the furnace 2 to provide the necessary heat. The heated feed, referred to as preheated feed, is flashed or otherwise introduced through conduit 4 into the distillation column 30. Steam is charged through 5 into the distillation column 30 to effect stripping of undesired light components from the residuum. Residuum or topped crude is removed through 6. Vapors pass upwardly through distillation tray 7. Tray 7 represents the first tray positioned above the point at which feed is introduced into the distillation column. Overhead vapors pass through conduit 29 and condenser 31 to accumulator 32. Fractions 12 (light hydrocarbon vapor), 14 (light straight run liquid gasoline), 16 (liquid naphtha), 18 (liquid kerosene), 20 (liquid diesel base) and 22 (liquid gas oil) are removed at points above the feed inlet.

Liquid produced from the condensation of vapors above the tray 7 accumulates in the trap-out pan 17 of tray 7. The accumulated liquid flows via conduit 8 and orifice 9 onto the top tray 19 of the lower stripping section. Flow control means 10 senses this liquid flow through orifice 9. Level controller 15 senses the level of liquid in trap-out pan 17.

The amount of fuel charged through conduit 3 to the furnace 2 is regulated by valve 11 which in turn is controlled by temperature controller 13. The temperature controller 13 receives a signal from a temperature sensing means (e.g. a thermocouple) positioned in conduit 4 representative of the temperature of the preheated feed flowing through conduit 4.

Typical operation, feed, and products are set forth in Table I below:

TABLE I

| Calculated Typical Operation, Feed & Products | | |
|---|---|---|
| (1) Crude Oil: Barrels/hr., | | 1,970 |
| °API at 60° F./60° F. | | 37 |
| Boiling Range, °F., | | |
| IBP. | 180 | |
| 10% | 300 | |
| 50% | 550 | |
| 70% | 657 | |
| 80% | 712 | |
| 90% | 775 | |
| (12) Vapor, SCF/hr., | | 0 |
| (14) Gasoline, BBL/hr., | | 390 |
| (16) Naphtha (200–400° F.), BBL/hr | | 155 |
| (18) Kerosene, BBL/hr., | | 190 |
| (20) Diesel Base, BBL/hr. | | 475 |
| (22) Virgin Gas Oil, BBL/hr. | | 180 |
| (6) Reduced Crude, BBL/hr., °API at 60° F./60° F., 21 | | 580 |

PREHEATING OF DISTILLATION FEED

This invention relates to process and apparatus for controlling the extent to which a feed is heated prior to distillation. In one aspect this invention also relates to process and apparatus for saving energy in carrying out the distillation of a preheated feed. In another aspect this invention relates to the control of a preheating means. In yet another aspect this invention relates to the distillation of a feed such as, for example, crude oil.

BACKGROUND

The first major processing step in a petroleum refinery is typically the distillation of crude oil into fractions corresponding to various boiling point ranges. By way of example, a typical distillation produces a vapor (light hydrocarbon) fraction, a light straight run gasoline fraction, a naphtha fraction, a diesel base fraction and a gas oil fraction. The distillation residuum is referred to as the topped crude.

Prior to distillation the crude oil is usually subjected to a desalting operation. The desalting operation is typically followed by a preheating operation to heat the crude oil to a temperature sufficient to effect vaporization of a portion of the crude oil. The preheated feed is introduced into a distillation means such as, for example, a fractionation column. The distillation separates the crude oil into the desired fractions which serve as feedstocks for various other operations at the refinery.

The amount of heat supplied to the crude oil in the preheating means determines (when all other conditions are held constant) the extent to which the crude oil is vaporized. It is only desired to vaporize the components corresponding to the distilled fractions. It is not desired, at this stage, to vaporize the portion of the crude oil corresponding to the distillation residuum. If too much heat is supplied to the crude oil too much vapor is produced. The excess vapor must be condensed in the fractionation column before it can be removed as residuum (i.e. topped crude). As a result of the overheating, energy is needlessly wasted. If too little heat is supplied to the crude oil, too little vapor is produced. As a result certain components desired in the fractions are not vaporized and are lost to the residuum. Consequently, it is desirable to control the preheating of crude oil such that vaporization of the crude oil occurs to the extent desired.

Given this description of the problem it is readily apparent that it would also be desirable to effect a similar control over the preheating of distillation feeds other than crude oil. Accordingly my invention, which provides a solution to the above-identified problem, is broadly applicable to distillation operations in general, even though it is especially well suited to crude oil distillation.

OBJECTS

It is an object of my invention to optimize the utilization of energy in a distillation process.

It is another object of my invention to control the extent to which a feed is heated prior to distillation.

These objects and other objects and advantages will be apparent from a study of this disclosure and the appended claims.

DESCRIPTION OF THE DRAWING

The FIGURE depicts a furnace, a distillation column, and a control system for regulating the rate at which fuel is supplied to the furnace.

SUMMARY OF THE INVENTION

In accordance with this invention the extent to which a feed is heated by a preheating means (or in a preheating zone) is varied and controlled in response to the amount of liquid in a liquid condensate collection means. This invention includes both process and apparatus to effect the desired control and results.

Vapor condensed in a distillation column is collected in a liquid condensate collection means. The amount of liquid in the collection means is measured by an amount-measuring means. In one embodiment of this invention the amount of liquid in the collection means is determined by measuring the level of liquid in the collection means.

The extent to which the feed is heated prior to distillation is controlled in response to the amount of liquid in the collection means. In one embodiment the heat supplied to the feed is (1) increased when the amount of liquid in the collecting means decreases and (2) decreased when the amount of liquid in the collection means increases. In this manner it is possible to maintain the amount of liquid in said collection means within a preselected range and thus to make the most efficient use of the energy required to heat the feed.

In one embodiment of this invention the feed is heated by a furnace and the fuel introduced into said furnace is regulated by a valve. The valve is controlled in response to the amount of liquid in the collection means.

This invention is further defined by the disclosure and claims which follow. The numerous embodiments and aspects set forth therein are considered to be part of this invention.

DETAILED DESCRIPTION

The term feed is used in this disclosure and in the claims to indicate any material capable of being fractionated in a distillation column. This includes, but is not limited to, organic material, hydrocarbons, crude oil, etc. By way of nonlimiting example it is noted that the invention is well suited for application in a refinery where crude oil is distilled.

In accordance with this invention a feed is heated by a preheating means (or in a preheating zone) and introduced into a distillation column to effect fractionation of the feed. As vapor condenses in the distillation column it is collected in a liquid condensate collection means. The amount of heat supplied to the feed is controlled in response to the amount of liquid in the liquid condensate collection means.

In one embodiment of this invention a means for removing liquid from the collection means is provided. This liquid removal means can include, for example, flow-through orifices in the bottom of the collection means or in a conduit in open communication with an outlet in the collection means. If the rate at which liquid is removed from the collection means is not great enough to offset the rate at which liquid is collected in the collection means, then the amount of liquid in the collection means will increase. Conversely, if the rate at which liquid is removed from the collection means is greater than the rate at which liquid is collected in the TABLE I-continued

| Calculated Typical Operation, Feed & Products | |
| --- | --- |
| (5) Steam (800° F., 150 psig), lbs./hr., | 3,000 |
| (4) Typical liquid-vapor: | |
| Temperature, °F. | 650 |
| Wt. % vaporized | 69 |
| (8) Typical Flow From Trap-Out Tray | |
| Barrels/hour | 25 |
| Temperature, °F. | 600 |
| Tower (30) | |
| Pressures, psig., | |
| Top, | 2 |
| Trap-out Tray, | 7 |
| Bottom, | 8 |
| Temperatures, °F., | |
| Top, | 315 |
| Trap-out Tray, | 600 |
| Bottom, | 610 |

The liquid in the trap-out pan 17 is shown in the drawing to be at the desired level b. The pressure differential across orifice 9 is determined and a signal is transmitted to the flow controller 10. This signal is representative of the flow through the orifice. The level controller 15 also transmits a signal to the flow controller 10. This signal is representative of the level of liquid in the trap-out pan 17 and serves as a set point for the flow controller 10. The flow controller 10 transmits a signal to temperature controller 13. This signal serves as a set point for temperature controller 13.

When the signal from orifice 9 and the signal from level controller 15 are "equal" (i.e. when the liquid level is centered at b) there is no change in the signal sent from flow controller 10 to temperature controller 13.

When the liquid level rises (i.e. approaches level a) the signals from orifice 9 and from level controller 15 are no longer "equal" and the signal from flow controller 10 to temperature controller 13 is adjusted to reflect the difference between the signals from 9 and 15. The rise in liquid level in trap-out pan 17 indicates that too much of the feed is being vaporized (i.e. lower boiling constituents of the residuum are being vaporized). This represents a waste of the fuel burned in furnace 2 to heat the feed. The adjusted signal from 10 to 13 will provide the temperature controller 13 with a new set point to correct the problem. Temperature controller 13 will, in turn, act on valve 11 to reduce the amount of fuel flowing to the furnace 2 and thus lower the temperature to which the feed is heated. As a result less residuum is needlessly vaporized; fuel is saved; and the liquid level in trap-out pan 17 will fall.

When the liquid level falls or drops (i.e. approaches c) the signals from orifice 9 and from level controller 15 are not "equal". The signal from flow controller 10 to temperature controller 13 is adjusted to reflect the difference between the signals from 9 and 15. The fall in liquid level indicates that not enough of the feed is vaporized and that unvaporized lighter material is being lost to the liquid residuum (which can result in too low of a flash point for the residuum). The adjusted signal from 10 to 13 will provide temperature controller 13 with a new set point to correct the problem. Temperature controller 13 will, in turn, act on valve 11 to increase the amount of fuel flowing to the furnace 2 and thus increase the temperature to which the feed is heated. In this manner a greater portion of the feed is vaporized; less of the lighter material is lost to the liquid residuum; and the liquid level in trap-out pan 17 will rise.

The capability of the above-described apparatus to react to, and compensate for, a change in the liquid level improves operation of the process in that fuel is saved and loss of lighter materials to the liquid residuum is reduced. The above-described apparatus and process enables continuous operation with the level of liquid being substantially maintained at a constant level or within a preselected range.

Another embodiment of this invention includes the apparatus and process of the FIGURE modified as follows. The signal from level controller 15 is passed directly to the temperature controller 13. This obviates the need for flow controller 10. Orifice 9 is optional and serves only to monitor the flow through conduit 8 to the stripping section. The apparatus and process is otherwise as described above.

I claim:

1. Apparatus comprising:
   (a) a preheating means for heating feed;
   (b) a distillation column;
   (c) a feed means for introducing feed heated by said preheating means into said distillation column;
   (d) a liquid condensate collection means positioned above said feed means of said distillation column, for collecting liquid produced by the condensation of vapor in said distillation column;
   (e) a means for measuring the amount of liquid in said liquid condensate collection means; and
   (f) a means to control the extent to which feed is heated by said preheating means in response to the amount of liquid in said liquid condensate collection means.

2. Apparatus according to claim 1 wherein said preheating means is a furnace.

3. Apparatus according to claim 2 wherein said furnace is adapted to burn fuel to heat feed; and wherein said means to control the extent to which feed is heated comprises a means for regulating the amount of fuel supplied to said furnace.

4. Apparatus according to claim 1 wherein said means for introducing feed into said distillation column includes a conduit running from said preheating means to said distillation column.

5. Apparatus according to claim 1 wherein said liquid condensate collection means is a trap-out pan.

6. Apparatus according to claim 1 wherein said means for measuring the amount of liquid in said liquid condensate collection means is a means for measuring the level of liquid in said collection means.

7. Apparatus comprising:
   (a) a preheating means for heating feed;
   (b) a distillation column;
   (c) a means for introducing feed heated by said preheating means into said distillation column through a feed inlet in said distillation column;
   (d) a liquid condensate collection means for collecting liquid produced by the condensation, in said distillation column, of vapor;
   (e) a means for removing liquid from said collection means; and
   (f) a control means to increase the heat supplied to feed by said preheating means when the amount of liquid in said collection means decreases and to decrease the heat supplied to feed by said preheating means when the amount of liquid in said collection means increases.

8. Apparatus according to claim 7 wherein said control means comprises (i) a means for measuring the level of liquid in said collection means; (ii) a means for creating a signal representative of said level; and (iii) at least one controller for regulating the amount of heat supplied to feed by said preheating means.

9. Apparatus according to claim 8 wherein said preheating means is a fuel-burning furnace; wherein said apparatus further comprises a means for supplying fuel to said furnace; and wherein said at least one controller regulates the amount of fuel supplied to said furnace.

10. Apparatus according to claim 7 wherein said distillation column includes a plurality of distillation trays positioned above said feed inlet; wherein at least one of said trays has a trap-out pan; and wherein the liquid condensate collection means of (d) is the lowest of said trap-out pans.

11. Apparatus according to claim 10 wherein the lowest of said trays above said feed inlet has a trap-out pan.

12. Apparatus comprising:
 (a) a furnace for heating feed;
 (b) a means for introducing fuel into said furnace;
 (c) a distillation column;
 (d) a means for passing feed through said furnace;
 (e) a feed means for introducing feed into said distillation column through a feed inlet in said distillation column;
 (f) a liquid condensate collection means positioned above said feed means of said distillation column, for collecting liquid produced from the condensation of vapor in said distillation column;
 (g) a liquid level controller having (1) means to measure the level of liquid in said liquid condensate collection means and (2) means to transmit a signal representative of said level;
 (h) a means for removing liquid from said liquid condensate collection means;
 (i) a means for sensing the temperature of feed in said means for introducing feed into said distillation column;
 (j) a means to transmit a signal representative of said temperature;
 (k) a temperature controller having means to receive said signal representative of said level and said signal representative of said temperature and to generate a signal in response thereto; and
 (l) a means to vary and control the rate at which fuel is introduced into said furnace in response to the signal transmitted from said temperature controller.

13. Apparatus comprising:
 (a) a furnace for heating feed;
 (b) a means for introducing fuel into said furnace;
 (c) a distillation column;
 (d) a means for passing feed through said furnace;
 (e) a feed means for introducing feed into said distillation column through a feed inlet in said distillation column;
 (f) a liquid condensate collection means positioned above said feed means of said distillation column, for collecting liquid produced from the condensation of vapor in said distillation column;
 (g) a liquid level controller having (1) means to measure the level of liquid in said liquid condensate collection means and (2) means to transmit a signal representative of said level;
 (h) a conduit for removing liquid from said liquid condensate collection means;
 (i) a means for measuring the flow rate of liquid through said conduit;
 (j) a means to transmit a signal representative of said flow rate;
 (k) a flow controller having means to receive said signal representative of said level and said signal representative of said flow rate, and having means to transmit a signal;
 (l) a means to sense the temperature of feed in said means for introducing feed into said distillation column;
 (m) a means to transmit a signal representative of said temperature;
 (n) a temperature controller having means to receive said signal from said flow controller and said signal representative of said temperature and to generate a signal in response thereto; and
 (o) a means to vary and control the rate at which fuel is introduced into said furnace in response to the signal transmitted from said temperature controller.

14. Apparatus according to claim 12 having a conduit running through said furnace and to said distillation column adapted such that feed can pass through said conduit; wherein said distillation column includes a plurality of distillation trays positioned above said feed inlet; wherein at least one of said trays has a trap-out pan; and wherein the liquid condensate collection means of (f) is the lowest of said trap-out pans.

15. Apparatus according to claim 13 having a conduit running through said furnace and to said distillation column adapted such that feed can pass through said conduit; wherein said distillation column includes a plurality of distillation trays positioned above said feed inlet; wherein at least one of said trays has a trap-out pan; and wherein the liquid condensate collection means of (f) is the lowest of said trap-out pans.

16. Apparatus according to claim 14 having a valve for controlling the introduction of fuel into said furnace.

17. Apparatus according to claim 12 adapted to maintain the level of liquid in said collection means within a preselected range.

18. Apparatus according to claim 13 adapted to maintain the level of liquid in said collection means within a preselected range.

19. A process comprising:
 (i) heating a feed in a preheating zone;
 (ii) introducing said feed into a distillation column through a feed inlet;
 (iii) fractionating said feed in said distillation column;
 (iv) collecting liquid in a liquid condensate collection means positioned above said feed inlet of said distillation column; said liquid being produced by the condensation of vapor in said distillation column; and
 (v) controlling the extent to which said feed is heated in said preheating zone in response to the amount of liquid in said liquid condensate collection means.

20. A process according to claim 19 further comprising removing liquid from said collection means.

21. A process according to claim 20 wherein the amount of heat supplied to said feed is increased in response to a decrease in the amount of liquid in said collection means; and wherein the amount of heat supplied to said feed is decreased in response to an increase in the amount of liquid in said collection means.

22. A process according to claim 21 wherein the amount of liquid in said collection means is determined by measuring the level of liquid in said collection means.

23. A process according to claim 22 wherein the level of liquid in said collection means is substantially maintained within a preselected range.

24. A process according to claim 20 wherein said feed is crude oil.

25. A process according to claim 23 wherein said feed is crude oil.

26. A process according to claim 20 wherein said preheating zone comprises a furnace.

27. A process according to claim 26 wherein fuel is introduced into, and burned in, said furnace; and wherein the rate at which said fuel is introduced into said furnace is controlled in response to the amount of liquid in said collection means.

28. A process according to claim 27 wherein the introduction of fuel into said furnace is regulated by a valve; and wherein said valve is controlled in response to the amount of liquid in said collection means.

29. A process according to claim 22 wherein said preheating zone comprises a furnace; wherein fuel is introduced into, and burned in, said furnace; wherein the rate at which said fuel is introduced into said furnace is increased when the level of liquid in said collection means falls; and wherein the rate at which said fuel is introduced into said furnace is decreased when the level of liquid in said collection means rises.

30. A process according to claim 20 wherein said distillation column comprises a plurality of distillation trays; wherein at least one of said trays has a trap-out pan; and wherein the liquid condensate collection means of (iv) is the lowest of said trap-out pans.

31. A process according to claim 30 wherein the lowest of said trays above said feed inlet has a trap-out pan.

32. A process according to claim 29 wherein said feed is crude oil.

33. A method for using the apparatus of claim 12 comrising:
(i) passing a feed through said furnace;
(ii) introducing fuel into said furnace;
(iii) burning said fuel in said furnace to heat said feed;
(iv) introducing said heated feed into said distillation column through said feed inlet;
(v) fractionating said feed in said distillation column;
(vi) collecting, in said liquid condensate collection means, liquid produced from the condensation, in said distillation column, of vapor;
(vii) measuring the level of liquid in said collection means;
(viii) transmitting from said liquid level controller to said temperature controller a signal representative of said level;
(ix) sensing the temperature of said heated feed before it is introduced into said distillation column;
(x) transmitting a signal representative of said temperature to said temperature controller; and
(xi) employing a signal from said temperature controller to control the rate at which fuel is introduced into said furnace;
wherein the rate at which fuel is introduced into said furnace increases in response to a drop in the level of liquid in said collection means; and wherein the rate at which fuel is introduced into said furnace decreases in response to a rise in the level of liquid in said collection means.

34. A method for using the apparatus of claim 13 comprising:
(i) passing a feed through said furnace;
(ii) introducing a fuel into said furnace;
(iii) burning said fuel in said furnace to heat said feed;
(iv) introducing said heated feed into said distillation column through said feed inlet;
(v) fractionating said feed in said distillation column;
(vi) collecting, in said liquid condensate collection means, liquid produced from the condensation, in said distillation column, of vapor;
(vii) measuring the level of liquid in said collection means;
(viii) transmitting from said liquid level controller to said flow controller a signal representative of said level;
(ix) removing liquid from said collection means through said conduit;
(x) measuring the flow rate of liquid through said conduit;
(xi) transmitting to said flow controller a signal representative of said flow rate;
(xii) transmitting a signal from said flow controller to said temperature controller;
(xiii) sensing the temperature of said heated feed before it is introduced into said distillation column;
(xiv) transmitting a signal representative of said temperature to said temperature controller; and
(xv) employing a signal from said temperature controller to control the rate at which fuel is introduced into said furnace;
wherein the rate at which fuel is introduced into said furnace increases in response to a drop in the level of liquid in said collection means; and wherein the rate at which fuel is introduced into said furnace decreases in response to a rise in the level of liquid in said collection means.

35. A method according to claim 34 wherein the introduction of fuel into said furnace is regulated by a valve; and wherein said signal from said temperature controller controls said valve.

36. A method according to claim 35 wherein said liquid condensate collection means is a trap-out pan.

37. A method according to claim 36 wherein said feed is crude oil.

38. A method according to claim 34 wherein liquid is removed from said collection means and directed to a section of said distillation column below said feed inlet.

39. A method according to claim 34 wherein the level of liquid in said condensation means is substantially maintained within a preselected range.

40. A method according to claim 35 wherein said distillation column includes a plurality of distillation trays positioned above said feed inlet; wherein at least one of said trays has a trap-out pan; and wherein the liquid condensate collection means of (vi) is the lowest of said trap-out pans.

41. A method according to claim 40 wherein the lowest of said trays has a trap-out pan and said feed is crude oil.

* * * * *